US012742039B2

(12) United States Patent
Li et al.

(10) Patent No.: US 12,742,039 B2
(45) Date of Patent: Sep. 22, 2026

(54) METHOD FOR PREPARING GLUTARYL-BRIDGED BIS-BIOGENIC GUANIDINE CHELATE AND METHOD FOR PREPARING POLYBUTYLENE SUCCINATE

(71) Applicant: Polytex Chemical Engineering Co., Ltd., Yangzhou (CN)

(72) Inventors: Hong Li, Yangzhou (CN); Dubin Wang, Yangzhou (CN)

(73) Assignee: POLYTEX CHEMICAL ENGINEERING CO., LTD., Yangzhou (CN)

( * ) Notice: Subject to any disclaimer, the term of this patent is extended or adjusted under 35 U.S.C. 154(b) by 437 days.

(21) Appl. No.: 18/587,873

(22) Filed: Feb. 26, 2024

(65) Prior Publication Data

US 2025/0122334 A1 Apr. 17, 2025

(30) Foreign Application Priority Data

Oct. 11, 2023 (CN) ......................... 202311312572.9

(51) Int. Cl.
*C08G 63/82* (2006.01)
*C07F 3/06* (2006.01)
*C07F 15/02* (2006.01)
*C07F 19/00* (2006.01)
*C08G 63/16* (2006.01)
*C08G 63/83* (2006.01)
*C08K 3/32* (2006.01)

(52) U.S. Cl.
CPC .............. *C08G 63/826* (2013.01); *C07F 3/06* (2013.01); *C07F 15/025* (2013.01); *C07F 19/005* (2013.01); *C08G 63/16* (2013.01); *C08G 63/83* (2013.01); *C08K 3/32* (2013.01); *C08G 2230/00* (2013.01); *C08K 2003/328* (2013.01)

(58) Field of Classification Search
CPC ...... C08G 63/826; C08G 63/16; C08G 63/83; C08G 2230/00; C08G 63/06; C07F 3/06; C07F 15/025; C07F 19/005; C07F 3/003; C08K 3/32
See application file for complete search history.

(56) References Cited

U.S. PATENT DOCUMENTS

2016/0375402 A1* 12/2016 Li .......................... B01D 53/62
423/234
2022/0033577 A1* 2/2022 Li .......................... C08L 67/03

OTHER PUBLICATIONS

Closs, "1,3,4,6-Tetraamino-2,5-diazapentalenes: Delocalized Antiaromatic Compounds," 1988, Angew. Chem. Int. Ed. Engl. 27, 6, pp. 842-845. (Year: 1988).*
Kretschmer, "Ligands with Two Monoanionic N,N-Binding Sites: Synthesis and Coordination Chemistry," 2020, Chem. Eur. J., 26, pp. 2099-2119. (Year: 2020).*

* cited by examiner

*Primary Examiner* — Robert S Jones, Jr.
*Assistant Examiner* — Joshua Caleb Bledsoe
(74) *Attorney, Agent, or Firm* — MATTHIAS SCHOLL P.C.; Matthias Scholl

(57) ABSTRACT

A method for preparing glutaryl-bridged bis-biogenic guanidine chelate (GbG)$MX_2$ including contacting biogenic guanidine (G) with glutaryl chloride in DMSO solvent for an acylation reaction, to yield glutaryl-bridged bis-biogenic guanidine GbG (G-b-G), and mixing the glutaryl-bridged bis-biogenic guanidine GbG as a chelating ligand and a non-toxic metal salt $MX_2$ in an amphiphilic mixed solvent DMSO-$H_2O$ for a ligand addition reaction, to yield glutaryl-bridged bis-biogenic guanidine chelate (GbG)$MX_2$. The biogenic guanidine (G) is selected from arginine (Arg), guanidine acetic acid (Gaa), creatine (Cra), and creatinine (Cran). M represents $Fe^{2+}$, $Mg^{2+}$, or $Zn^{2+}$; and X represents $Cl^-$, $AcO^-(CH_3COO^-)$, $LaO^-(CH_3CH(OH)COO^-)$. The glutaryl-bridged bis-biogenic guanidine chelate (GbG)$MX_2$ can be used as a catalyst for production of polybutylene succinate (PBS) using succinic anhydride (SAn) and BDO as monomers through a batch process or a continuous process. The catalyst of (GbG)$MX_2$ of the disclosure is non-toxic, and the PBS synthesized features excellent environmental and biological safety.

9 Claims, 1 Drawing Sheet

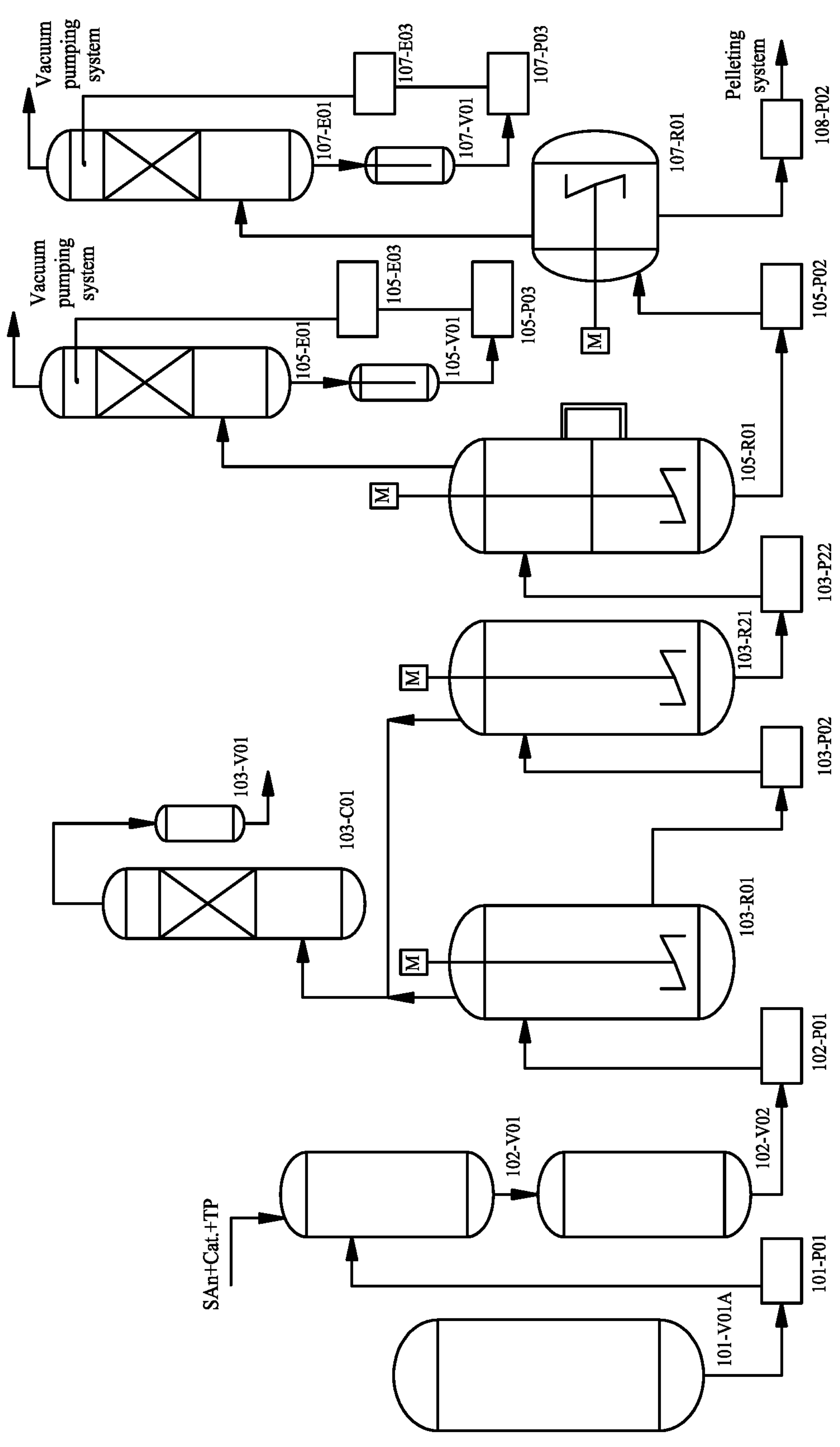
Vacuum pumping system
107-E03
107-P03
107-E01
107-V01
107-R01
Pelleting system
108-P02
Vacuum pumping system
105-E03
105-P03
105-E01
105-V01
M
105-R01
105-P02
103-V01
103-C01
M
103-R21
103-P22
103-P02
M
103-R01
102-P01
102-V01
102-V02
SAn+Cat.+TP
101-V01A
101-P01

METHOD FOR PREPARING GLUTARYL-BRIDGED BIS-BIOGENIC GUANIDINE CHELATE AND METHOD FOR PREPARING POLYBUTYLENE SUCCINATE

CROSS-REFERENCE TO RELATED APPLICATIONS

Pursuant to 35 U.S.C. § 119 and the Paris Convention Treaty, this application claims foreign priority to Chinese Patent Application No. 202311312572.9 filed Oct. 11, 2023, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to the synthesis of biodegradable polyester materials, and more particularly to a method for preparing glutaryl-bridged bis-biogenic guanidine chelate $(GbG)MX_2$ and method for preparing polybutylene succinate (PBS).

Much attention has been paid to the synthesis of environmentally friendly and biodegradable polymers for they would eventually decompose to carbon dioxide and water in nature. Polybutylene succinate (PBS) is a renewable biodegradable aliphatic polyester with good thermal-mechanical properties and processing performance.

Conventionally, the following methods are used for synthesizing PBS:

1. Direct method, which uses succinic acid (SA) and 1,4-butanediol (BDO) as monomers to synthesize PBS polyester through direct dehydration condensation of carboxyl and hydroxyl groups. The method adopts an antimony ethylene glycol-binary catalyst. A binary catalyst of antimony ethylene glycoside-ammonium cerium sulfate is reported that it exhibits excellent catalytic performance for synthesizing PBS through the method, and a product polymer with $M_w$ $1.2\times10^5$ is prepared.
2. Chain extension method, which first prepares PBS oligomers using SA and BDO as monomers, and then synthesizes PBS with increased molecular weight through a macromolecular coupling reaction between the oligomers and chain extenders. Among the catalysts that have been studied, a binary catalyst stannous chloride-p-toluenesulfonic acid exhibits good performance, and a PBS resin with $M_w$ $1.2\times10^5$ is obtained.
3. Transesterification method, which uses dialkyl succinate (usually dimethyl succinate DMS) and BDO as monomers. The polymerization undergoes first the transesterification followed by polycondensation (PC). A PBS resin with $M_w$ $1.06\times10^5$ is synthesized using antimony oxide ($Sn_2O_3$), which has been widely used as a catalyst of PC.
4. Ring opening esterification-polycondensation (ROE-PC) method, which uses succinic anhydride (SAn) and BDO as monomers. The polymerization process involves first a ring opening esterification reaction (ROE) between SAn and BDO, followed by a catalytic polycondensation. Recent research indicates that using stannous octanoate as a catalyst at a molar ratio of DBO/SAn of 2.2:1-2.8:1, a PBS resin with $M_w$ $9\times10^4$ is prepared.

The antimony-based catalysts (antimony dioxide, antimony ethylene glycoside, etc.) and tin-based catalysts (stannous chloride, stannous octanoate, etc.) used in the PBS synthesis have cytotoxicity. The PBS polyester synthesized therefrom cannot be used in the biomedical field. Even if used as general plastics, the toxic metal compounds released from discarded plastic products in the environment can cause serious pollution to the ecological environment.

SUMMARY

The disclosure provides a method for preparing glutaryl-bridged bis-biogenic guanidine chelate $(GbG)MX_2$ and a method for preparing polybutylene succinate (PBS) using the glutaryl-bridged bis-biogenic guanidine chelate $(GbG)MX_2$ as a catalyst.

Technical solution 1: the discourse provides a method for preparing glutaryl-bridged bis-biogenic guanidine chelate $(GbG)MX_2$, the method comprising:

1) contacting biogenic guanidine (G) with glutaryl chloride in a solvent DMSO, to yield glutaryl-bridged bis-biogenic guanidine GbG (G-b-G), with a reaction formula as follows:

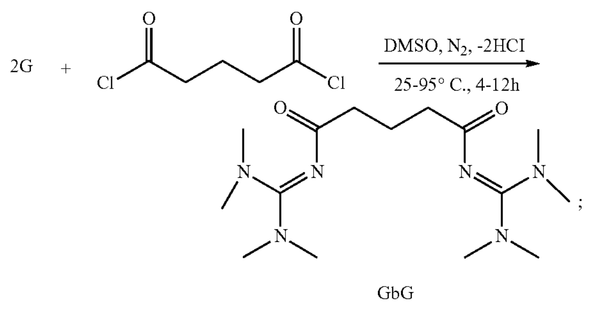

where, biogenic guanidine (G) is selected from arginine (Arg), guanidine acetic acid (Gaa), creatine (Cra), and creatinine (Cran); DMSO is dimethyl sulfoxide in short;

operations in 1) comprise: adding DMSO to a first reactor, and adding biogenic guanidine (G) and glutaryl chloride in a molar ratio thereof of 2:1 to the first reactor, and stirring a first mixture in the first reactor at 25-95° C. under nitrogen protection for 4-12 hours; recycling the solvent DMSO from the first mixture through vacuum distillation and obtaining a resulting first solid; transferring the first solid to Buchner funnel, washing the first solid with deionized water and ethanol in sequence, removing the water and ethanol through filtration under reduced pressure, vacuum drying at 40-60° C. for 12-24 hours, to yield GbG, with a yield of ≥98%;

2) mixing the glutaryl-bridged bis-biogenic guanidine GbG as a chelating ligand and a non-toxic metal salt $MX_2$ in an amphiphilic mixed solvent DMSO-$H_2O$ for a ligand addition reaction at 25-80° C. for 4-8 hours under nitrogen protection and continuous stirring, to yield a glutaryl-bridged bis-biogenic guanidine chelate $(GbG)MX_2$, with a reaction formula as follows:

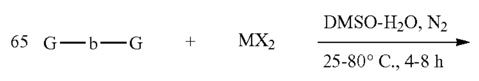

-continued

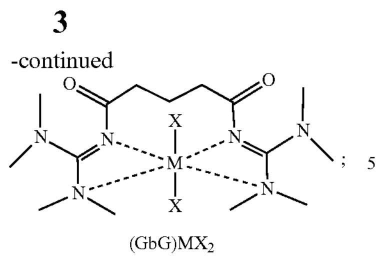

$(GbG)MX_2$ where, M represents $Fe^{2+}$, $Mg^{2+}$, or $Zn^{2+}$; and X represents $Cl^-$, $AcO^-(CH_3COO^-)$, $LaO^-(CH_3CH(OH)COO^-)$;

operations in 2) comprise: adding the amphiphilic mixed solvent DMSO-$H_2O$ to a second reactor, and adding the glutaryl-bridged bis-biogenic guanidine GbG and the non-toxic metal salt $MX_2$ with a molar ratio of 1:1 to the second reactor, stirring a second mixture in the second reactor at 25-80° C. for 4-8 hours under nitrogen protection and continuous stirring; recycling the amphiphilic mixed solvent from the second mixture through vacuum distillation and collecting a resulting second solid; placing the second solid in a Buchner funnel, washing the second solid with deionized water and ethanol in turn, decompression draining to remove residual ethanol, vacuum drying at 40-60° C. for 12-24 hours, to yield glutaryl-bridged bis-biogenic guanidine chelate $(GbG)MX_2$, with a yield of ≥99%.

Technical solution 2: the discourse further provides a method for preparing poly(butylene succinate) (PBS) with the glutaryl-bridged bis-biogenic guanidine chelate (GbG) $MX_2$, prepared according to the method in Technical Solution 1, as a catalyst;

poly(butylene succinate) (PBS) is prepared through a catalytic ring opening esterification-polycondensation reaction (ROE-PC) with a reaction formula as follows:

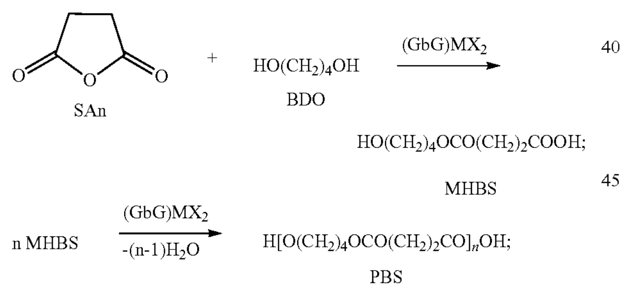

where, MHBS: monohydroxybutyl succinate, and n represent an average degree of polymerization: $1.11\times10^3$-$1.5\times10^3$.

The method comprises a batch process (30 L reactor) and a continuous process (400 ton/year PBS).

1) The batch process comprises: starting a stirrer of a polymerization reactor; adding a first half of a predetermined molar quantity of 1,4-butanediol (BDO) to the polymerization reactor; evenly mixing the glutaryl-bridged bis-biogenic guanidine chelate $(GbG)MX_2$, a heat stabilizer, and SAn, and adding a resulting mixture to the polymerization reactor; adding a second half of 1,4-butanediol to the polymerization reactor; purging air in the polymerization reactor with nitrogen, and heating the polymerization reactor under atmospheric pressure and nitrogen protection to 160-2° C. and holding for 90-100 min for ring opening esterification, reducing a pressure in the polymerization reactor to 80±0.2 kPa, continuously heating the polymerization reactor to 170±2° C. and holding for 25-30 min; gradually reducing the pressure in the polymerization reactor to 50±0.2 kPa and holding a temperature of 175±2° C. for 25-30 min for secondary esterification reaction; reducing the pressure in the polymerization reactor to 30±0.2 kPa and holding a temperature of 180±2° C. for 25-30 min, and gradually reducing the pressure in the polymerization reactor to 10±0.2 kPa and holding a temperature of 200±2° C. for 25-30 min for pre-polycondensation (pre-PC); reducing the pressure in the polymerization reactor to 60±3 Pa and holding a temperature of 235±5° C. for 90-100 min for polycondensation reaction; terminating the polycondensation reaction, discharging a resulting product under nitrogen pressure, pelletizing the product under water-cooling, and drying, to yield poly(butylene succinate) (PBS).

2) The large-scale industrialization of small-scale scientific research achievements in the chemistry field should be verified through intermediate industrialization experiments. The scientific research achievements of the disclosure were first verified through intermittent amplification experiments (30 L reactor), followed by continuous synthesis experiments of 400 t/y PBS. The sole FIGURE is a process flow diagram of a 400 t/y PBS continuous production device. The production process flow is as follows:

2.1) raw material formulating:

heating and melting 1,4-butanediol (BDO), pumping the 1,4-butanediol into a BDO raw material tank 101-V01A through a pneumatic pump, and then pumping the 1,4-butanediol into a slurry preparation tank 102-V01 through a raw material delivery pump 101-P01 and a flowmeter; evenly mixing the glutaryl-bridged bis-biogenic guanidine chelate $(GbG)MX_2$, a heat stabilizer TP, and SAn (a molar ratio of the BDO to SAn is between 1.16:1 and 1.17:1), and adding a resulting mixture through the feeding inlet to the slurry preparation tank; controlling a temperature in the slurry preparation tank at 60±2° C.; introducing prepared reaction materials in the slurry preparation tank to a slurry product tank 102-V02 through static pressure difference, and controlling a temperature in the slurry product tank at 60±2° C., a liquid level of 10%-80%; conveying the reaction materials from a top inlet into a ring opening esterification reactor 103-R01 through a slurry conveying pump 102-P01 at a conveying rate of 61.5±0.5 kg/h;

2.2) ring opening esterification and secondary esterification heating the ring opening esterification reactor to 170±2° C., maintaining a pressure in the ring opening esterification reactor at 80±0.2 kPa and a liquid level of 55±2% for ring opening esterification (ROE); introducing a product from the ring opening esterification reactor to a secondary esterification reactor 103-R21 through a ring-opening esterification product delivery pump 103-P02 at a delivery rate of 61.5±0.5 kg/h, controlling a temperature of the secondary esterification reactor at 175±2° C. and a pressure of 50±0.2 kPa for secondary esterification reaction, a liquid level of 40±2%; wherein, the ring opening esterification reactor and the secondary esterification reactor share one recovery tower 103-C01 to absorb water produced by esterification reaction, a small amount of by-product tetrahydrofuran, and recycle unreacted BDO, and the recovery tower operates under negative pressure;

2.3) pre-polycondensation reaction introducing a product from the secondary esterification reactor to a pre-polycondensation reactor 105-R01 through a transfer pump 103-P22 at a delivery rate of 56±0.5 kg/h, controlling a temperature of an upper chamber of the pre-polycondensation reactor at 175±2° C., a pressure of 30±0.2 kPa, and a liquid level of 35±2 kg, and a temperature of a lower chamber of the pre-polycondensation reactor at 200±5° C., a pressure of 10±0.2 kPa, and a liquid level of 55±2 kg for pre-polycondensation reaction;

2.4) polycondensation reaction introducing a product from the pre-polycondensation reactor 105-R01 to a polycondensation reactor 107-R01 through a conveying pump 105-P02 at a delivery rate of 50±0.5 kg/h, controlling a temperature of the polycondensation reactor at 235±5° C., a pressure of 60±3 kPa, and a liquid level of 30±2% to conduct polycondensation; introducing a product from the polycondensation reactor to a pelletizing section through a PBS conveying pump 108-P02 at a delivery rate of 50±0.5 kg/h, pelletizing under water-cooling conditions, and drying, to yield poly(butylene succinate) (PBS) products.

In a class of this embodiment, a molar ratio of the BDO to SAn is between 1.05:1 and 1.17:1.

In a class of this embodiment, a molar amount of (GbG) $MX_2$ accounts for $6\times10^{-5}$-$1.3\times10^{-4}$ of that of the SAn.

In a class of this embodiment, the heat stabilizer is titanium phosphate, and a molar amount of titanium phosphate accounts for $8\times10^{-5}$-$1.7\times10^{-4}$ of that of the SAn.

In a class of this embodiment, the poly(butylene succinate) (PBS) products have a weight average molecular weight Mw $1.9\times10^5$-$2.6\times10^5$, a molecular weight distribution index PDI 1.68-1.82; a melting point MP 115-117° C., and a thermal decomposition temperature $Td_{10}$ 387-391° C.

The following advantages are associated with the method for preparing glutaryl-bridged bis-biogenic guanidine chelate (GbG)$MX_2$ of the disclosure.

1. The catalyst of glutaryl-bridged bis-biogenic guanidine chelate (GbG)$MX_2$ of the disclosure is non-toxic, and the PBS polyester synthesized by the catalyst does not contain toxic metals, featuring excellent environmental and biological safety.
2. The catalyst of glutaryl-bridged bis-biogenic guanidine chelate has excellent catalytic performance for ring opening esterification and polyesterification: high catalytic activity (low catalytic dosage, fast reaction rate, mild reaction conditions); high selectivity for catalytic esterification and polyesterification (high ROE esterification rate, few by-products of BDO ring etherification, and less side reactions such as back-biting degradation and decarboxylation in the later stage of PC reaction).
3. The heat stabilizer TP is non-toxic and has good thermal stability: it can effectively inhibit the side reactions of thermal degradation of PBS macromolecules in the later stage of the PC; and improve the thermal stability, flame retardancy, and UV resistance of PBS polyesters.
4. The PBS synthesis reaction conditions are mild, with relatively low reaction temperature and short time, fewer side reactions, more energy-saving, and environmental friendliness.
5. The product obtained by the PBS synthesis method has high molecular weight, narrow molecular weight distribution, and high thermal stability.
6. The continuous synthesis process of 400 ton/year PBS of the disclosure provides a reliable basis for the design of large-scale continuous production process of PBS with an annual output of over 10000 tons.

BRIEF DESCRIPTION OF THE DRAWINGS

The invention is described hereinbelow with reference to accompanying drawings, in which the sole FIGURE is a process flow diagram of a 400 tons/year PBS continuous production device.

DETAILED DESCRIPTION

To further illustrate the disclosure, embodiments detailing a method for preparing glutaryl-bridged bis-biogenic guanidine chelate (GbG)$MX_2$ are described below. It should be noted that the following embodiments are intended to describe and not to limit the disclosure.

Example 1

Preparation of Bridged Bis-Biogenic Guanidine Chelate (Arg-b-Arg)$FeCl_2$ (1) Preparation of Bridged Bis-Biogenic Guanidine Arg-b-Arg To a first reactor equipped with an electro-mechanical stirrer, thermometer, reflux condenser and nitrogen inlet, 250 mL of DMSO, 0.02 mole (3.4840 g) of Arg, and 0.01 mole (1.6901 g) of glutaralyl chloride were added. The stirrer of the first reactor was started, nitrogen was introduced to replace the air in the first reactor thoroughly, and the mixture in the first reactor was continuously stirred at 25±1° C. for 12 h under nitrogen protection. A solvent was distilled under reduced pressure (recycled for use), and a first solid was collected and transferred to a Buchner funnel, and washed with deionized water and ethanol in turn. After the washing solvent was removed under reduced pressure, the first solid was put into a vacuum drying box and dried under vacuum at 60° C. for 24 h, to yield 4.3773 g of a finished product of bridged bis-biogenic guanidine Arg-b-Arg, with a yield of 98.5%.

(2) Preparation of Bridged Bis-Biogenic Guanidine Chelate (Arg-b-Arg)$FeCl_2$ 300 mL of DMSO-$H_2O$ mixed solvent (DMSO:$H_2O$=1:1, v/v), 2.2220 g (0.005 mole) of bridged bis-biogenic guanidine Arg-b-Arg, 0.6638 g (0.005 mole) of $FeCl_2$ were added into a second reactor, and nitrogen was introduced to replace the air in the second reactor thoroughly, and the mixture in the second reactor was continuously stirred at 25±1° C. for 8 h under nitrogen protection. A solvent was distilled under reduced pressure (recycled for use), and a second solid was collected and transferred to a Buchner funnel, and washed with deionized water and ethanol in turn. The second solid was drained under reduced pressure, and dried under vacuum at 60° C. for 24 h, to yield 2.8272 g of a finished product of bridged bis-biogenic guanidine chelate (Arg-b-Arg)$FeCl_2$, with a yield of 99.0%.

Example 2

Preparation of Bridged Bis-Biogenic Guanidine Chelate (Gaa-b-Gaa)Mg$(OLa)_2$ (1) Preparation of Bridged Bis-Biogenic Guanidine Gaa-b-Gaa To a first reactor which was the same as that in Example 1, 0.02 mole (2.3422 g) of Gaa and 0.01 mole (1.6901 g) of glutaryl chloride were added for reaction at 45±1° C. for 10 h. The other reaction conditions and operations were the same as that in Example 1. 3.2626 g of a finished product of bridged bis-biogenic guanidine Gaa-b-Gaa was obtained, with a yield of 98.8%.

(2) Preparation of Bridged Bis-Biogenic Guanidine Chelate (Gaa-b-Gaa)Mg$(OLa)_2$ To a second reactor, 0.005 mole (1.6511 g) of Gaa-b-Gaa and 0.005 mole (1.0123 g) of Mg$(OLa)_2$ were added for reaction at 40±1° C. for 6 h. The other reaction conditions and operations were the same as that in Example 1. 2.6393 g of a finished product of bridged bis-biogenic guanidine chelate (Gaa-b-Gaa)Mg$(OLa)_2$ was obtained, with a yield of 99.1%.

Example 3

Preparation of Bridged Bis-Biogenic Guanidine Chelate (Cra-b-Cra)Zn$(0Ac)_2$ (1) Preparation of Bridged Bis-Biogenic Guanidine Cra-b-Cra To a first reactor which was the same as that in Example 1, 0.02 mole (2.6226 g) of Cra and 0.01 mole (1.6901 g) of glutaryl chloride were added for reaction at 95±1° C. for 4 h. The other reaction conditions and operations were the same as that in Example 1. 3.5324 g of a finished product of bridged bis-biogenic guanidine Cra-b-Cra was obtained, with a yield of 98.6%.

(2) Preparation of Bridged Bis-Biogenic Guanidine Chelate (Cra-b-Cra)Zn$(0Ac)_2$ To a second reactor, 0.005 mole (1.7913 g) of Cra-b-Cra and 0.005 mole (0.9174 g) of Zn$(0Ac)_2$ were added for reaction at 80±1° C. for 4 h. The other reaction conditions and operations were the same as that in Example 1. 2.6952 g of a finished product of bridged bis-biogenic guanidine chelate (Cra-b-Cra)Zn$(0Ac)_2$ was obtained, with a yield of 99.5%.

Example 4

Preparation of PBS with Bridged Bis-Biogenic Guanidine Chelate (Arg-b-Arg)$FeCl_2$ 1. Batch Process Reaction materials: BDO: 73.5 mol (6.624 kg, SAn: 70.0 mol (7.005 kg); catalyst (Arg-b-Arg) $FeCl_2$: $4.2\times10^{-3}$ mole (2.3988 g); and heat stabilizer TP: $5.6\times10^{-3}$ mole (2.9315 g).

Synthesis process: starting a stirrer of a polymerization reactor; adding a first half of a predetermined molar quantity of the 1,4-butanediol (BDO) to the polymerization reactor; evenly mixing the glutaryl-bridged bis-biogenic guanidine chelate (GbG)$MX_2$, the heat stabilizer, and SAn, and adding a resulting mixture to the polymerization reactor; adding a second half of 1,4-butanediol to the polymerization reactor; purging air in the polymerization reactor with nitrogen, and heating the polymerization reactor under atmospheric pressure and nitrogen protection to 160-2° C. and holding for 90-100 min for ring opening esterification, reducing the pressure in the polymerization reactor to 80±0.2 kPa, slowly heating the polymerization reactor to 170±2° C. and holding for 25-30 min; gradually reducing the pressure in the polymerization reactor to 50±0.2 kPa and holding a temperature of 175±2° C. for 25-30 min for secondary esterification reaction; reducing the pressure in the polymerization reactor to 30±0.2 kPa and holding a temperature of 180±2° C. for 25-30 min, and gradually reducing the pressure in the polymerization reactor to 10±0.2 kPa and holding a temperature of 200±2° C. for 25-30 min for pre-polycondensation (pre-PC); reducing the pressure in the polymerization reactor to 60±3 Pa and holding a temperature of 235±5° C. for 90-100 min for polycondensation reaction; terminating the polycondensation reaction, discharging a resulting product under nitrogen pressure, pelletizing the product under water-cooling, and drying, to yield poly(butylene succinate) (PBS); the performance parameters of the final product: Mw $2.61\times10^5$, PDI 1.82, MP 117° C., $Td_{10}$ 390° C.

2. Continuous Process

Reaction materials: monomers BDO: 84 kg (932.09 mol, SAn: 80 kg (799.44 mol); BDO/SAN=1.166 (molar ratio); catalyst (Arg-b-Arg) $FeCl_2$: 27.4152 g ($4.8\times10^{-2}$ moles); heat stabilizer TP: 33.5034 g ($6.4\times10^{-2}$ mole).

Synthesis process: the reaction conditions and operations follow the description in aforesaid Method 2 of Technical Solution 2, and are carried out with a 400 t/y PBS continuous production device as shown in the sole FIGURE. The specifications and models of each component in the FIGURE are shown in Table 1.

TABLE 1

| Device Number | Device Name | Device Number | Device Name | Device Number | Device Name | Device Number | Device Name |
|---|---|---|---|---|---|---|---|
| 101-V01A | BDO raw material tank | 103-C01 | Recovery tower | 105-E01 | Spray condenser for precondensation | 107-E01 | Spray condenser for polycondensation |
| 101-P01 | Pneumatic pump | 103-V01 | Esterification water collection tank | 105-V01 | Liquid sealing tank for precondensation | 107-V01 | Sealing tank for polycondensation |
| 102-V01 | Slurry preparation tank | 103-P02 | Ring-opening esterification product delivery pump | 105-P03 | Vacuum circulation pump for precondensation | 107-P03 | Vacuum circulation pump for polycondensation |
| 102-V02 | Slurry product tank | 103-R21 | Secondary esterification | 105-E03 | Vacuum BDO cooler for | 107-E03 | Vacuum BDO cooler for |

TABLE 1-continued

| Device Number | Device Name | Device Number | Device Name | Device Number | Device Name | Device Number | Device Name |
|---|---|---|---|---|---|---|---|
| | | | reactor | | precondensation | | polycondensation |
| 102-P01 | Slurry conveying pump | 103-P22 | Secondary esterification product transfer pump | 105-P02 | Conveying pump for precondensation product | 108-P02 | PBS conveying pump |
| 103-R01 | Ring opening esterification reactor | 105-R01 | Precondensation reactor | 107-R01 | Polycondensation reactor | | |

The performance parameters of the final product: Mw $2.56\times10^5$, PDI 1.81, MP 117° C., $Td_{10}$ 391° C.

Example 5

Preparation of PBS with Bridged Bis-Biogenic Guanidine Chelate (Gaa-b-Gaa)Mg$(OLa)_2$ 1. Batch Process Reaction materials: monomers BDO: 77.0 mole (6.939 kg, SAn: 70.0 mole (7.005 kg); catalyst (Gaa-b-Gaa)Mg$(OLa)_2$: $6.3\times10^{-3}$ mole (3.3558 g); heat stabilizer TP: $8.4\times10^{-3}$ mole (4.3973 g).

The synthesis process is the same as that in Example 4. The performance parameters of the final product: Mw $2.28\times10^5$, PDI 1.79, MP 116° C., $Td_{10}$ 389° C.

2. Continuous Process

Reaction materials: monomers BDO: 84 kg; SAn: 80 kg, catalyst (Gaa-b-Gaa)Mg$(OLa)_2$: $7.19\times10^{-2}$ mole (38.2983 g); heat stabilizer TP: $9.6\times10^{-2}$ mole (50.2550 g).

Synthesis process: the reaction conditions and operations follow the description in aforesaid Method 2) of Technical Solution 2. The performance parameters of the final product: Mw $2.20\times10^5$, PDI 1.78, MP 116° C., $Td_{10}$ 388° C.

Example 6

Preparation of PBS with Bridged Bis-Biogenic Guanidine Chelate (Cra-b-Cra)Zn$(0Ac)_2$ 1. Batch Process Reaction materials: monomers BDO: 81.9 mole (7.381 kg, SAn: 70.0 mole (7.005 kg); catalyst (Cra-b-Cra)Zn $(0Ac)_2$: $9.1\times10^{-3}$ mole (4.9298 g); heat stabilizer TP: $1.2\times10^{-2}$ mole (6.2819 g).

The synthesis process is the same as that in Example 4. The performance parameters of the final product: Mw $1.98\times10^5$, PDI 1.68, MP 115° C., $Td_{10}$ 388° C.

2. Continuous Process

Reaction materials: monomers BDO: 84 kg, SAn: 80 kg; catalyst (Cra-b-Cra)Zn$(0Ac)_2$: $1.04\times10^{-1}$ mole (56.3410 g); heat stabilizer TP: $1.36\times10^{-1}$ mole (71.1946 g).

Synthesis process: the reaction conditions and operations follow the description in aforesaid Method 2) of Technical Solution 2. The performance parameters of the final product: Mw $1.96\times10^5$, PDI 1.70, MP 115° C., $Td_{10}$ 387° C.

It will be obvious to those skilled in the art that changes and modifications may be made, and therefore, the aim in the appended claims is to cover all such changes and modifications.

What is claimed is:

1. A method for preparing glutaryl-bridged bis-biogenic guanidine chelate $(GbG)MX_2$, the method comprising:

1) contacting biogenic guanidine (G) with glutaryl chloride, to yield glutaryl-bridged bis-biogenic guanidine GbG (G-b-G), with a reaction formula as follows:

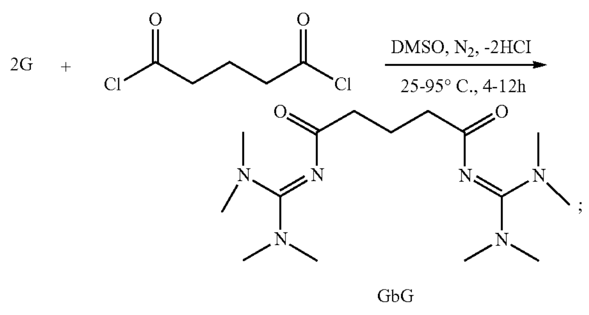

GbG wherein, biogenic guanidine (G) is selected from arginine (Arg), guanidine acetic acid (Gaa), creatine (Cra), and creatinine (Cran); DMSO is dimethyl sulfoxide;

operations in 1) comprise: adding DMSO to a first reactor, and adding biogenic guanidine (G) and glutaryl chloride to the first reactor, and stirring a first mixture in the first reactor under nitrogen protection; recycling DMSO from the first mixture through vacuum distillation and obtaining a resulting first solid; transferring the first solid to Buchner funnel, washing the first solid with deionized water and ethanol in sequence, removing the water and ethanol through filtration under reduced pressure, vacuum drying, to yield glutaryl-bridged bis-biogenic guanidine GbG, with a yield of ≥98%;

2) mixing the glutaryl-bridged bis-biogenic guanidine GbG as a chelating ligand and a non-toxic metal salt $MX_2$ in an amphiphilic mixed solvent DMSO-$H_2O$ for a ligand addition reaction, to yield glutaryl-bridged bis-biogenic guanidine chelate $(GbG)MX_2$, with a reaction formula as follows:

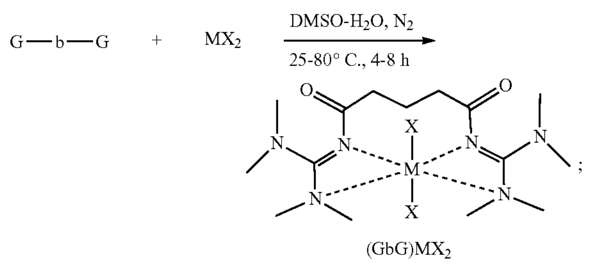

$(GbG)MX_2$ wherein, M represents $Fe^{2+}$, $Mg^{2+}$, or $Zn^{2+}$; and X represents $Cl^-$, $AcO^-(CH_3COO^-)$, $LaO^-(CH_3CH(OH)COO^-)$;

operations in 2) comprise: adding the amphiphilic mixed solvent DMSO-$H_2O$ to a second reactor, and adding the glutaryl-bridged bis-biogenic guanidine GbG and the non-toxic metal salt $MX_2$ to the second reactor, stirring a second mixture in the second reactor under nitrogen protection; recycling the amphiphilic mixed solvent from the second mixture through vacuum distillation and collecting a resulting second solid; transferring the second solid in a Buchner funnel, washing the second solid with deionized water and ethanol in turn, decompression draining to remove residual ethanol, vacuum drying, to yield glutaryl-bridged bis-biogenic guanidine chelate (GbG)$MX_2$, with a yield of ≥99%.

2. The method of claim 1, wherein in 1), a molar ratio of biogenic guanidine (G) to glutaryl chloride is 2:1; the first mixture is stirred in the first reactor at 25-95° C. for 4-12 hours; and in 2), a molar ratio of the glutaryl-bridged bis-biogenic guanidine GbG to the non-toxic metal salt $MX_2$ is 1:1; the second mixture is stirred in the second reactor at 25-80° C. for 4-8 hours.

3. The method of claim 1, wherein in 2), a volume ratio of DMSO to water in the amphiphilic mixed solvent DMSO-$H_2O$ is 1:1.

4. The method of claim 1, wherein the vacuum drying in 1) and 2) is carried out at 40-60° C. for 12-24 hours.

5. A method for preparing poly(butylene succinate) (PBS) with the glutaryl-bridged bis-biogenic guanidine chelate (GbG)$MX_2$ prepared according to the method of claim 1, poly(butylene succinate) (PBS) being prepared through a catalytic ring opening esterification-polycondensation reaction (ROE-PC) with a reaction formula as follows:

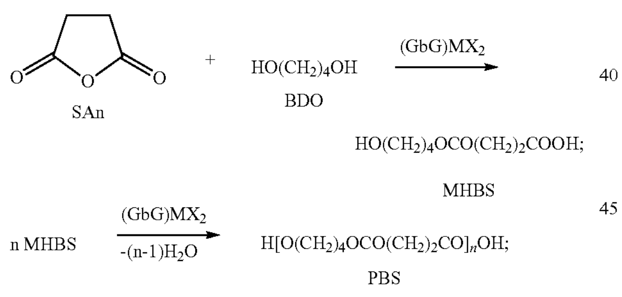

wherein, MHBS is monohydroxybutyl succinate, and n represent an average degree of polymerization: $1.11\times10^3$-$1.5\times10^3$;

the method comprises a batch process or a continuous process;

1) the batch process comprises: starting a stirrer of a polymerization reactor; adding a first half of a predetermined molar quantity of 1,4-butanediol (BDO) to the polymerization reactor; evenly mixing the glutaryl-bridged bis-biogenic guanidine chelate (GbG)$MX_2$, a heat stabilizer, and succinic anhydride (SAn), and adding a resulting mixture to the polymerization reactor;

adding a second half of 1,4-butanediol to the polymerization reactor; purging air in the polymerization reactor with nitrogen, and heating the polymerization reactor under atmospheric pressure and nitrogen protection to 160±2° C. and holding for 90-100 min for ring opening esterification, reducing a pressure in the polymerization reactor to 80±0.2 kPa, continuously heating the polymerization reactor to 170±2° C. and holding for 25-30 min; gradually reducing the pressure in the polymerization reactor to 50±0.2 kPa and holding a temperature of 175±2° C. for 25-30 min for secondary esterification reaction; reducing the pressure in the polymerization reactor to 30±0.2 kPa and holding a temperature of 180±2° C. for 25-30 min, and gradually reducing the pressure in the polymerization reactor to 10±0.2 kPa and holding a temperature of 200±2° C. for 25-30 min for pre-polycondensation (pre-PC); reducing the pressure in the polymerization reactor to 60±3 Pa and holding a temperature of 235±5° C. for 90-100 min for polycondensation reaction; terminating the polycondensation reaction, discharging a resulting product under nitrogen pressure, pelletizing the product under water-cooling, and drying, to yield poly(butylene succinate) (PBS);

2) the continuous process is performed with a 400 ton/year continuous device and comprises:

2.1) raw material formulating:

heating and melting 1,4-butanediol (BDO), pumping the 1,4-butanediol into a raw material tank through a pneumatic pump, and then pumping the 1,4-butanediol into a slurry preparation tank through a raw material delivery pump and a flowmeter; evenly mixing the glutaryl-bridged bis-biogenic guanidine chelate (GbG)$MX_2$, a heat stabilizer, and SAn, and manually adding a resulting mixture through a feeding inlet to the slurry preparation tank;

controlling a temperature in the slurry preparation tank at 60±2° C.; introducing prepared reaction materials in the slurry preparation tank to a slurry product tank through static pressure difference, and controlling a temperature in the slurry product tank at 60±2° C., a liquid level of 10%-80%; conveying the reaction materials from a top inlet into a ring opening esterification reactor through a slurry conveying pump at a conveying rate of 61.5±0.5 kg/h;

2.2) ring opening esterification and secondary esterification:

heating the ring opening esterification reactor to 170±2° C., maintaining a pressure in the ring opening esterification reactor at 80±0.2 kPa and a liquid level of 55±2% for ring opening esterification (ROE); introducing a product from the ring opening esterification reactor to a secondary esterification reactor at a delivery rate of 61.5±0.5 kg/h, controlling a temperature of the secondary esterification reactor at 175±2° C. and a pressure of 50±0.2 kPa for secondary esterification reaction, a liquid level of 40±2%; wherein, the ring opening esterification reactor and the secondary esterification reactor share one recovery tower to absorb water produced by esterification reaction, a small amount of by-product tetrahydrofuran, and recycle unreacted BDO, and the recovery tower operates under negative pressure;

2.3) pre-polycondensation reaction:

introducing a product from the secondary esterification reactor to a pre-polycondensation reactor at a delivery rate of 56±0.5 kg/h, controlling a temperature in an upper chamber of the pre-polycondensation reactor at 175±2° C., a pressure of 30±0.2 kPa, and a liquid level of 35±2 kg, and a temperature in a lower chamber of the pre-polycondensation reactor at 200±5° C., a pressure of 10±0.2 kPa, and a liquid level of 55±2 kg for pre-polycondensation reaction;

2.4) polycondensation reaction:

introducing a product from the pre-polycondensation reactor to a polycondensation reactor at a delivery rate of 50±0.5 kg/h, controlling a temperature of the polycondensation reactor at 235±5° C., a pressure of 60±3 kPa, and a liquid level of 30±2% to conduct polycondensation; introducing a product from the polycondensation reactor to a pelletizing section at a delivery rate of 50±0.5 kg/h, pelletizing under water-cooling conditions, and drying, to yield poly(butylene succinate) (PBS) products.

6. The method of claim 5, wherein a molar ratio of the BDO to the SAn is between 1.05:1 and 1.17:1.

7. The method of claim 5, wherein a molar amount of $(GbG)MX_2$ accounts for $6\times10^{-5}$-$1.3\times10^{-4}$ of that of the SAn.

8. The method of claim 5, wherein the heat stabilizer is titanium phosphate (TP), and a molar amount of titanium phosphate accounts for $8\times10^{-5}$-$1.7\times10^{-4}$ of that of the SAn.

9. The method of claim 5, wherein the poly(butylene succinate) (PBS) products have a weight average molecular weight Mw $1.9\times10^{5}$-$2.6\times10^{5}$, a molecular weight distribution index PDI 1.68-1.82; a melting point MP 115-117° C., and a thermal decomposition temperature $Td_{10}$ 387-391° C.

* * * * *